June 6, 1961

F. GAROFALO ET AL 2,986,922

METHOD FOR TESTING METALS

Filed Dec. 14, 1955

INVENTORS:
FRANK GAROFALO and
GEORGE V. SMITH,
BY: Donald G. Dalton
their Attorney.

June 6, 1961  F. GAROFALO ET AL  2,986,922
METHOD FOR TESTING METALS
Filed Dec. 14, 1955  2 Sheets-Sheet 2
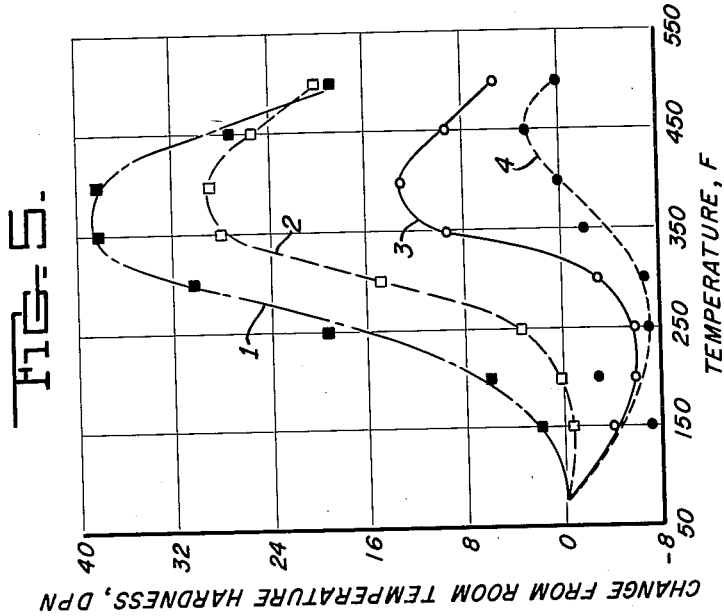
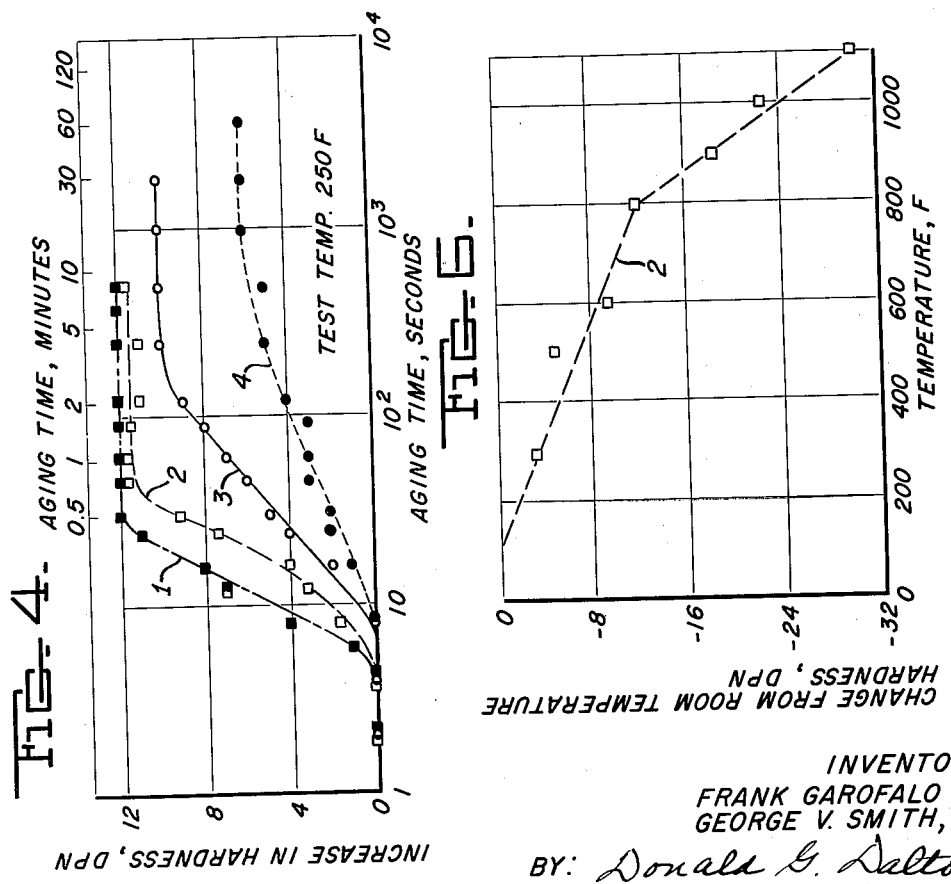
INVENTORS:
FRANK GAROFALO and
GEORGE V. SMITH,
BY: Donald G. Dalton
their Attorney

United States Patent Office 2,986,922
Patented June 6, 1961

2,986,922
METHOD FOR TESTING METALS

Frank Garofalo, Metuchen, N.J., and George V. Smith, Ithaca, N.Y., assignors to United States Steel Corporation, a corporation of New Jersey
Filed Dec. 14, 1955, Ser. No. 553,104
3 Claims. (Cl. 73—15.4)

This invention relates to a method for testing metals exhibiting strain-aging characteristics and more particularly to a method for determining rapidly and accurately the strain-aging properties of steels.

In measuring the susceptibility to strain-aging in steels by conventional means, such as determining changes in their mechanical properties during strain-aging, it is required that the material be initially deformed, aged at a suitable temperature, and subsequently tested. The machining, prestraining and retesting of aged specimens is expensive and, what is more important, time consuming to the extent prohibiting the application of this conventional testing practice for controlling shipments of steel from the plants producing it.

It is therefore an object of the present invention to provide a very sensitive means for obtaining quantitative indications of the degree of strain-aging of metals.

A further object is determining strain-aging characteristics using a single test piece.

A still further object is a method for determining strain-aging properties within a short time.

Other objects of the present invention will become apparent on reading the following detailed description in conjunction with the attached drawings:

FIGURES 3, 4, 5 and 6 are graphs in accordance with the legends thereon.

We have discovered that the change in hardness due to strain-aging taking place within a short time after deformation and occurring at moderately elevated temperatures can be conveniently used for classifying steels according to their strain-aging characteristics, provided the amount of deformation is essentially the same for any given series of tests.

Figure 3:
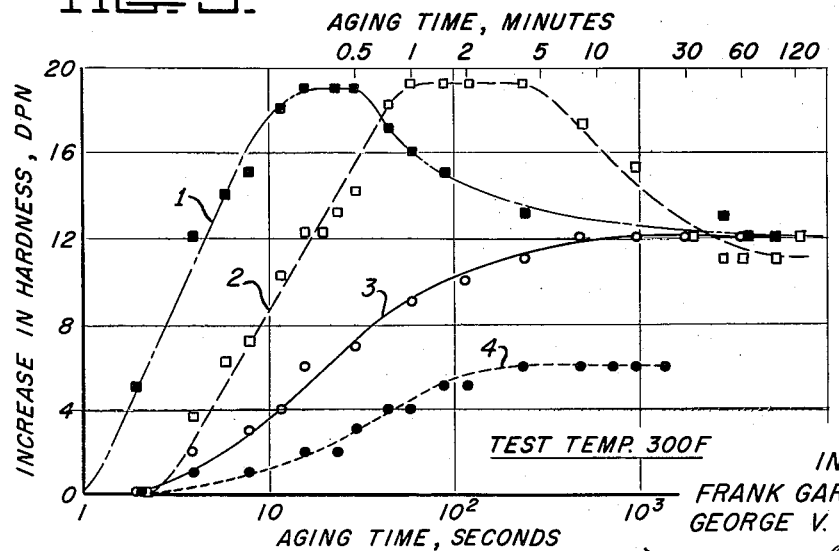

Basically our invention consists in inducing a deformation in definite areas of a metal being tested, exposing said deformed areas to the effect of heat for varying time intervals, measuring hardness developed in said deformed and heated areas, and plotting hardness so determined against aging time, the character of the curves so produced being indicative of the strain-aging properties of the steel under test. Our preferred method of plotting the results is shown in FIGURES 3 and 4 wherein the difference between the measured hardness after aging and a base value determined initially by making one impression with total load within 2 seconds is plotted against aging time. In general the base value so obtained in low carbon steels will not reflect any strain-aging effects at temperatures below 300° F.

Figure 1:
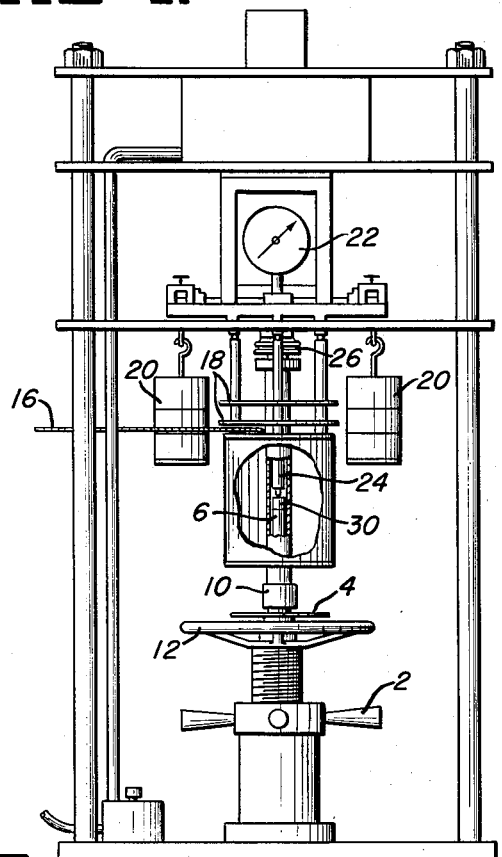
FIGURE 1 is a schematic elevation of apparatus suitable for practicing our invention.
Figure 2:
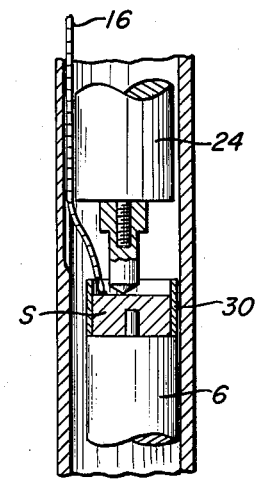
FIGURE 2 is an enlarged detail thereof.

While for reducing our method to practice variable equipment may be used, such as penetration-hardness testing machines provided with suitable heating means, we prefer to employ the hot hardness testing device shown in FIGURE 1 of the attached drawings which is a penetration-hardness type of testing machine.

The screw jack assembly of the device has a coarse adjustment 2 which serves to elevate the rotating stage 4 and anvil 6 supporting the specimen S until a low-fusion metal seal 10 is formed at the lower end of the furnace. The fine adjustment 12 elevates the specimen into testing position. The anvil 6 is seated in the top of the screw jack assembly with its center of rotation slightly offset from the axis of the screw jack. Since the indenter 24 is aligned with the axis of the screw jack, a series of impressions can be made on the specimen about its center by rotating the stage.

The furnace utilizes a Nichrome heating element wound around an Alundum tube forming the core of the furnace and the test chamber and properly insulated. A control thermocouple 16 is located in a groove on the side of the Alundum tube. Two stainless steel fins 18 mounted above the furnace protect the loading mechanism 20 and penetration indicator 22 from undue radiation. The test chamber is attached to the indenter stem 24 through a flexible bellows 26 which permits the transmission of the load to specimen while preserving the atmosphere of the test chamber which is maintained inert through using a mixture of helium and hydrogen. For eliminating the effect of the last traces of oxygen, the insertion in the heating chamber of a titanium getter 30 has been found advantageous.

Specimens to be used in connection with the above apparatus need to have a smooth surface for receiving the impression of the indenter such as is associated with metallographic polish, and thickness adequate for unimpeded effect of the penetrator. For steel samples this thickness may be taken on the order of one-eighth of an inch, and their area chosen around $3/8''$ diameter or $3/8''$ square, the test surface being maintained parallel to the base.

In testing, a specimen S is placed on the anvil 6, the furnace chamber flushed with gas mixture and heated to the desired temperature until the temperature is stabilized. Then the anvil is raised by means of the fine adjustment until the depth gage indicates (by an 0.0001 inch motion) the establishing of a contact between the indenter and the sample. At this point a desired deformation is applied to the sample by forcing it against the penetrator by means of the fine adjustment until the depth gage reads a specific penetration, 0.0035 inch for example.

The deformed area of the specimen is now allowed to age for a predetermined time such as 2 seconds or greater with indenter in contact with it and then full load of the machine, usually 10 kilograms is applied to it and the final impression is made. After lowering the sample, the rotating stage is turned to an appropriate extent to expose a fresh area of the sample to the indenter, and the above operation repeated until the total number of impressions which a sample can provide is made. Then the furnace is allowed to cool, the specimen removed, and the impressions made on it measured in an appropriate manner, for example with a microscope, and interpreted into desired hardness units in the manner described in "Metals Handbook," 1948 edition, pages 93–105, published by American Society for Metals.

Hardness of several steels determined in this manner at constant temperature levels of 300 and 250° F. is plotted against aging time in FIGURES 3 and 4 which clearly depict the response of any given steel to the strain-aging effect. It permits classification of stock on this basis within a few hours. Although the time necessary for obtaining complete aging in low carbon steels above 250° F. is at most 5 minutes, flushing of the testing chamber, heating and cooling requires between 1 and 2 hours. Conventional aging tests take days. In the graphs of the figures, curve 1 is based on capped Bessemer steel; curve 2, capped open-hearth steel; curve 3, killed duplex steel and curve 4, killed Bessemer steel.

In curves of FIGURES 3 and 4, the increasing steepness of corresponding graphs corresponds to a more pronounced tendency of steel to strain-age, and their interpretation in the terms of this property follow well-established lines.

It will be noted from these curves that, for most application, strain-aging measurable in seconds is sufficient to present a clear picture of the response of a specimen to strain-aging, and a matter of two-minute aging being capable to develop its full extent.

In FIGURE 5, we have shown an alternate but more time consuming embodiment wherein the aging-time is held constant and the temperature is changed between impressions. With this method, strain-aging characteristics of a metal over a wide range of temperatures can be obtained with the use of only a single test sample. The increase in hardness as temperature is increased shows that during penetration of the sample by the indenter, appreciable strain-aging occurs. With the equipment above described, penetration requires about 25 seconds. In the absence of strain-aging, the hardness decreases continuously as temperature is increased. This is shown in FIGURE 6, wherein results are plotted on a sample of capped open-hearth steel which had been held in an atmosphere of moist hydrogen at 1700° F. for 54 hours to eliminate all strain-aging tendencies.

While two embodiments of our invention have been shown and described, it will be apparent that other adaptations and modifications may be made without departing from the scope of the invention, as defined in the following claims.

We claim:

1. The method for determining strain-aging characteristics of a metallic body which comprises primarily penetrating a portion of the metallic body by an indenting member to a determined depth while at a strain-aging temperature, aging said penetrated area for a predetermined time interval, thereafter applying a predetermined load to the indenting member while positioned at the point of the primary indentation to secondarily indent said deformed area, and then moving said body relative said indenter to provide an unindented area in alignment with the indenter, maintaining the indenting member and the metallic body at the same temperature and repeating said operations with varying time intervals between the primary and secondary identations, measuring the depth of indentations and converting these measurements into hardness numbers to thereby determine the strain-aging properties of said metallic body.

2. The method for determining strain-aging characteristics of a metallic body which comprises primarily penetrating a portion of the metallic body by an indenting member to a determined depth while at a strain-aging temperature, aging said penetrated area for a predetermined time interval, thereafter applying a predetermined load to the indenting member while positioned at the point of the primary indentation to secondarily indent said deformed area, and then moving said body relative said indenter to provide an unindented area in alignment with the indenter, repeating said operations with a constant time interval between the primary and secondary indentations, the temperature of the workpiece being increased between the primary and secondary indentations, measuring the depth of indentations and converting these measurements into hardness numbers to thereby determine the strain-aging properties of said metallic body.

3. The method for determining strain-aging characteristics of metal which comprises placing a specimen thereof on the anvil of a hardness testing machine of the penetration-hardness type, heating until said specimen and the indenter of said machine reach a predetermined temperature, keeping this temperature constant, bringing the indenter in contact with the specimen, advancing said specimen against said indenter until an impression of a desired depth is produced, allowing indented specimen to age for a predetermined time without breaking its contact with the indenter, applying to the indenter a load normally used for hardness determination in the machine, removing the indenter from its impression, turning the specimen to expose a fresh area thereof to the indenter, bringing the indenter in contact with the specimen, advancing said specimen against said indenter until an impression of the same depth as original is produced, allowing the specimen to age for a time longer than when making the first determination without breaking its contact with the indenter, applying to the indenter a load normally used for hardness determination in the machine, removing the indenter from its impression, repeating this cycle holding the temperature and the depth of original impression constant and lengthening the aging time of each successive impression over the aging time used in the preceding impression until a desired number of determinations is made, cooling the specimen, measuring the impressions produced, converting these measurements into hardness numbers and plotting these numbers against the aging time, the curves so produced being indicative of the strain-aging characteristics of the metal.

References Cited in the file of this patent
UNITED STATES PATENTS

| | | |
|---|---|---|
| 2,258,424 | Smith | Oct. 7, 1941 |
| 2,375,033 | Parke et al. | May 1, 1945 |

FOREIGN PATENTS

| | | |
|---|---|---|
| 1,048,117 | France | July 29, 1953 |

OTHER REFERENCES

Metal Progress, vol. 60, No. 6, pp. 72 and 73, December 1951; Instruments, vol. 20, pp. 1006 and 1066.